United States Patent [19]

Ishikuro et al.

[11] Patent Number: 4,578,311

[45] Date of Patent: Mar. 25, 1986

[54] MAGNETIC RECORDING MEDIUM

[75] Inventors: Tadashi Ishikuro; Ryuji Shirahata; Takahito Miyoshi; Masaaki Fujiyama, all of Kanagawa, Japan

[73] Assignee: Fuji Photo Film Co., Ltd., Kanagawa, Japan

[21] Appl. No.: 614,930

[22] Filed: May 29, 1984

[30] Foreign Application Priority Data

May 27, 1983 [JP] Japan .................................. 58-92495

[51] Int. Cl.$^4$ ............................................... G11B 5/72
[52] U.S. Cl. .................................... 428/336; 360/134; 360/135; 360/136; 427/128; 427/131; 428/323; 428/408; 428/694; 428/900
[58] Field of Search ............... 428/694, 695, 403, 407, 428/408, 900, 336, 323; 427/44, 130, 131, 128; 360/134–136

[56] References Cited

U.S. PATENT DOCUMENTS

| | | | |
|---|---|---|---|
| 4,367,261 | 1/1983 | Miyoshi | 428/330 |
| 4,414,270 | 11/1983 | Miyoshi | 428/330 |
| 4,419,406 | 12/1983 | Isobe | 428/694 |

Primary Examiner—Ellis P. Robinson
Attorney, Agent, or Firm—Sughrue, Mion, Zinn, Macpeak and Seas

[57] ABSTRACT

A magnetic recording medium is disclosed which comprises a non-magnetic support having provided on opposite surface thereof a magnetic recording layer, and a backing layer containing carbon black and a binder, said carbon having an average particle size of not less than 150 m$\mu$ and the weight ratio of carbon black and the binder being 1:3.0 to 1:10.

5 Claims, No Drawings

MAGNETIC RECORDING MEDIUM

BACKGROUND OF THE INVENTION

The present invention relates to a magnetic recording medium, and more particularly to a magnetic recording medium having a decreased abrasion coefficient without being accompanied by decrease in electromagnetic properties, an improved running durability, a backing layer of the tape without being scraped away, an excellent mechnical strength and an improved curling resistance.

Generally, magnetic recording tapes include audio tapes, video tapes and computer tapes, which are coated type magnetic recording media as described in U.S. Pat. No. 3,630,910. However, with the recent increased demand for high density recording, a ferromagnetic thin metal film type magnetic recording medium which is prepared by vapor deposition method such as vacuum deposition, sputtering or ion plating or plating such as electric plating or electroless plating as described in U.S. Pat. Nos. 4,002,546, 4,226,681, 4,354,908, etc. has drawn attention and has been put into practical use. With regard to magnetic recording tapes for audio, video or computer, the surface of the magnetic recording layer is made smooth to improve sensitivity (i.e., particularly output in a high frequency region), and the thickness of the tape is prepared to have 20μ. Therefore, the backing layer is thin and omission (scraping away or drop off) which is the cause of drop out readily occurs. Additionally, tape strength is deteriorated, whereby creases easily occur, causing curling, drop out and change of output, which affect running properties and winding properties.

There are serious defects in the metal thin film type magnetic recording medium that (1) abrasion resistance toward the magnetic head or guide pole is large upon recording, reproducing and erasing signals, and therefore wear resistance is worse, (2) abrasion coefficient toward tape guiding systems for magnetic tapes to run is large because a smooth support is used for high density and high S/N recording, and therefore running is unstable and (3) a metal thin film is vapor deposited on a smooth surface of the tape and therefore curling of the tape is large.

SUMMARY OF THE INVENTION

An object of the present invention is to provide a magnetic recording medium having excellent running durability without being accompanied by the increase in abrasion coefficient and excellent curling resistance properties.

Another object of the present invention is to provide a magnetic recording medium having a backing layer which is suitable for both a coated type tape and a metal thin film type magnetic tape without deteriorating S/N characteristics of the magnetic medium.

Objects of the present invention can be attained by the magnetic recording medium comprising a non-magnetic support having provided on opposite surfaces thereof a magnetic recording layer and a backing layer containing carbon black and a binder, said carbon black having an average particle size of not lower than 150 mμ and the weight of ratio of carbon black and the binder being 1:3.0 to 1:10.

DETAILED DESCRIPTION OF THE INVENTION

The reason why abrasion coefficient can be decreased and running durability can be improved in this invention is guessed that porosity is high since a coarse carbon having an average particle size of not less than 150 mμ is used, a large amount of lubricants can be stored therein and a lubricity can be maintained for a long period of time. An average particle size of carbon black used in this invention is not less than 150 mμ and preferably 200 to 500 mμ. Preferred examples of carbon black include "Raven MT-P" (280 mμ) manufactured by Columbia Carbon Co., Ltd., "thermal Black MT" (300 mμ) manufactured by Carncarb Co. and "Sevacarb MI-CI" (350 mμ) manufactured by Sevalco Co.

The particle size of carbon black is determined according to ASTM D-3849-79, D-3037-76 and D-1511-79. Binders for the backing layer are those which are commonly used in this field such as a thermoplastic resin, a thermosetting resin, a reactive type resin or a mixture thereof. Binders can be selected from those shown below and those that are the mixture of at least two kinds and have the glass transition temperature (Tg) of not lower than 40° C. are preferable and those having Tg of not lower than 60° C. are the most preferable.

Thermoplastic resins include a copolymer of vinyl chloride-vinyl acetate, a copolymer of vinyl chloride-vinylidene chloride, a copolymer of vinyl chloride-acrylonitrile, a copolymer of acrylate-acrylonitrile, a copolymer of acrylate-vinylidene chloride, a copolymer of acrylate-styrene, a copolymer of methacrylate-acrylonitrile, a copolymer of merthacrylate-vinylidene chloride, a copolymer of methacrylate-styrene, urethane elatomer, polyvinyl fluoride, a copolymer of vinylidene chloride-acrylonitrile, a copolymer of butadiene-acrylonitrile, a polyamide resin, a polyvinyl butyral, a cellulose resin (e.g., cellulose acetate butyrate, cellulose diacetate, cellulose propionate, nitrocellulose and the like), a copolymer of styrene-butadiene, a polyester resin, a copolymer of chlorovinyl ether-acrylate, an amino resin, and various rubber resins as described in U.S. Pat. No. 4,135,016.

Thermosetting resins or reactive type resins include a phenol resin, an epoxy resin, a curable polyurethane resin, a urea resin, melamine resin, an alkyd resin, an acryle resin, polyisocyanate, and polyamine as described in U.S. Pat. No. 4,135,016.

Of these, cellulose resin, urethane elastomers, polyesters, polyurethanes and polyisocyanates are preferred.

The weight ratio of carbon black and a binder used for the backing layer in this invention is 1:3.0 to 1:10, preferably 1:4 to 1:8. When this ratio is less than 1:10 the abrasion coefficient of the resulting tape tends to increase.

The thickness of the backing layer in this invention is preferably not more than 2μ, and more preferably 0.3 to 1.5μ most preferably 0.5 to 1.0μ.

High molecular supports used in this invention include an acid cellulose; cellulose nitrate; ethyl cellulose; methyl cellulose; polyamide; polymethyl methacrylate, polytetrafluoroethylene; polytrifluoroethylene; a polymer or copolymer of α-olefin such as ethylene or propylene; a polymer or a copolymer of vinyl chloride; polyvinylidene chloride; polycarbonate; polyimide; polyesters such as polyethylene terephthalate as described in U.S. Pat. No. 4,135,016. Of these, polyimides and polyethylene terephthalates are preferred.

Examples of this invention will be explained. Part in Examples means part by weight.

EXAMPLE 1

A polyethylene terephthalate support having a thickness of 14μ was provided on opposite surfaces with a magnetic recording layer containing Co-containing iron oxide and a backing layer. The backing layer having the following composition was coated to have a dry thickness of 1μ, varying the average particle diameter of carbon black. Thus obtained samples were named Sample Nos. 1 to 5.

Nitrocellulose: 25 parts
Polyurethane (Trade name "Nipporan 2301" manufactured by Nihon Polyurethan Co., Ltd.): 15 parts
Polyisocyanate (Trade Name "Coronate L" manufactured by Nihn Polyurethan Co., Ltd.) Carbon black (Average particle sizes are shown in Table 1. Additive amounts are shown in Table 1): 40 parts
Methyl ethyl ketone: 480 parts

EXAMPLE 2

A polyurethane terephthalate support having a thickness of 12μ was provided on opposite surfaces thereof with a Co—Ni (Ni 20 wt%) magnetic recording layer (thickness 0.15μ) which was formed by oblique vapor deposition and a backing layer. The backing layer having the same composition as in Example 1 was coated to have a dry thickness of 1μ. Thus prepared samples were named Sample Nos. 6 and to 8.

TABLE 1

| Sample | Carbon Black Particle Diameter (mμ) | Carbon Black Additive Amount (parts) | Abrasion After 100 Passes Magnetic Recording Layer | Coefficient Backing Layer | Running Durability (passes) | Still Life (min.) | Curling Resistance |
|---|---|---|---|---|---|---|---|
| 1 | 50 | 20 | 2.5 | 2.0 | about 350 | not less than 60 | O |
| 2 | 100 | 20 | 2.5 | 1.7 | about 400 | not less than 60 | O |
| 3 | 280* | 20 | 2.5 | 1.6 | not less than 500 | not less than 60 | O |
| 4 | 280 | 40 | 2.5 | 2.0 | about 300 | 30 | O |
| 5 | 280 | 60 | 2.5 | 2.0 | about 150 | 15 | O |
| 6 | 50 | 20 | 2.5 | 2.5 | about 100 | 10 | X |
| 7 | 100 | 20 | 2.5 | 2.3 | about 300 | 30 | Δ |
| 8 | 280* | 20 | 2.5 | 1.6 | not less than 500 | not less than 60 | O |

Note:
*Samples 3 and 8 are those of the present invention and others are comparative samples.

Each sample of the above magnetic tapes were tested and the results are shown in Table 1.

Test Method (1) Running durability and still durability were tested by mounting tapes on VHS type VTR. Running durability was evaluated by counting how many times tapes made passes without causing running troubles such as edge damage or running stop after tapes made running repeatedly on VTR.

(2) Abrasion coefficient was evaluated on a magnetic recording layer and a backing layer by measuring kinetic abrasion coefficient $T_2/T_1$ of a stainless pole, using tapes which made 100 passes on VTR.

(3) Curling resistance properties were evaluated by observing curling statuses of tapes which were placed horizontally. The results were evaluated on a three-grade basis.

| Height of Curling From Horizontal Surface | Evaluation |
|---|---|
| $\theta$ = not less than 1000 mμ | X |
| $\theta$ = 500 to 1000 mμ | Δ |
| $\theta$ = lower than 500 mμ | O |

While the invention has been described in detail and with reference to specific embodiment thereof, it will be apparent to one skilled in the art that various changes and modifications can be made therein without departing from the spirit and scope thereof.

What is claimed is:

1. A magnetic recording medium comprising a non-magnetic support having provided on opposite surfaces thereof a magnetic recording layer, and a backing layer containing carbon black and a binder, said carbon having an average particle size of 200 to 500 mμ and the weight ratio of carbon black and the binder being 1:3.0 to 1:10.

2. The magnetic recording medium as claimed in claim 1, wherein the weight ratio of carbon black and the binder is 1:4 to 1:8.

3. The magnetic recording medium as claimed in claim 1, wherein the thickness of the backing layer is not more than 2μ.

4. The magnetic recording medium as claimed in claim 3, wherein the thickness of the backing layer is 0.3 to 1.5μ.

5. The magnetic recording medium as claimed in claim 4, wherein the thickness of the backing layer is 0.5 to 1.0μ.

* * * * *